United States Patent
Ohashi

(10) Patent No.: US 9,135,703 B2
(45) Date of Patent: Sep. 15, 2015

(54) INFORMATION PROCESSING APPARATUS AND INFORMATION PROCESSING METHOD AND PROGRAM FOR THEM

(75) Inventor: Takeshi Ohashi, Tokyo (JP)

(73) Assignees: SONY CORPORATION, Tokyo (JP); JAPANESE FOUNDATION FOR CANCER RESEARCH, Tokyo (JP)

(*) Notice: Subject to any disclaimer, the term of this patent is extended or adjusted under 35 U.S.C. 154(b) by 1021 days.

(21) Appl. No.: 13/248,489

(22) Filed: Sep. 29, 2011

(65) Prior Publication Data

US 2012/0095331 A1    Apr. 19, 2012

(30) Foreign Application Priority Data

Oct. 18, 2010    (JP) .................... 2010-233279

(51) Int. Cl.
*A61B 5/05*    (2006.01)
*G06T 7/00*    (2006.01)
*G06K 9/00*    (2006.01)

(52) U.S. Cl.
CPC ..... *G06T 7/0014* (2013.01); *G06T 2207/10081* (2013.01); *G06T 2207/20081* (2013.01); *G06T 2207/30096* (2013.01)

(58) Field of Classification Search
None
See application file for complete search history.

(56) References Cited

U.S. PATENT DOCUMENTS

| | | | |
|---|---|---|---|
| 2006/0098858 A1* | 5/2006 | Guittet | 382/133 |
| 2009/0190812 A1 | 7/2009 | Sano et al. | |
| 2010/0250275 A1* | 9/2010 | Sakagawa et al. | 705/2 |
| 2010/0280842 A1* | 11/2010 | Iwase et al. | 705/2 |
| 2011/0111435 A1* | 5/2011 | Dobson et al. | 435/7.23 |

FOREIGN PATENT DOCUMENTS

| | | |
|---|---|---|
| JP | 9-281405 | 10/1997 |
| JP | 2004-33539 | 2/2004 |
| JP | 2004-216008 A | 8/2004 |
| JP | 2008-242984 | 10/2008 |
| JP | 2009-39221 A | 2/2009 |
| JP | 2009-157527 A | 7/2009 |
| JP | 2009-175040 | 8/2009 |
| JP | 2009-207545 A | 9/2009 |
| JP | 2010-33476 | 2/2010 |

OTHER PUBLICATIONS

Office Action issued Apr. 15, 2014, in Japanese Patent Application No. 2010-233279.

* cited by examiner

*Primary Examiner* — Amara Abdi
(74) *Attorney, Agent, or Firm* — Oblon, McClelland, Maier & Neustadt, L.L.P.

(57) ABSTRACT

Disclosed herein is an information processing apparatus including: a lesion progress rate recognition section configured to perform prescribed image recognition processing on a plurality of entered medical images, thereby recognizing the lesion progress rate that represents the rate of progress of the disease-induced change in living body; and a presentation control section configured to cause a presentation section to present the medical images according to the lesion progress rate which has been recognized by the lesion progress rate recognition section.

13 Claims, 15 Drawing Sheets

MEDICAL IMAGES

LESION PROGRESS RATE RECOGNITION IMAGE
SCORE FOR LESION PROGRESS RATE : 0.56

MEDICAL IMAGES

| DOCTOR'S NAME | SPECIAL FIELD | LEVEL OF SKILL (1 TO 10) |
|---|---|---|
| Dr. A | EPITHELIAL, MODERATELY DIFFERENTIATED | 5 |
| Dr. B | EPITHELIAL, WELL DIFFERENTIATED | 10 |
| Dr. C | MESENCHYMOMA | 7 |
| Dr. D | MALIGNANT LYMPHOMA | 1 |
| Dr. E | EPITHELIAL, POORLY DIFFERENTIATED | 2 |
| ⋮ | ⋮ | ⋮ |

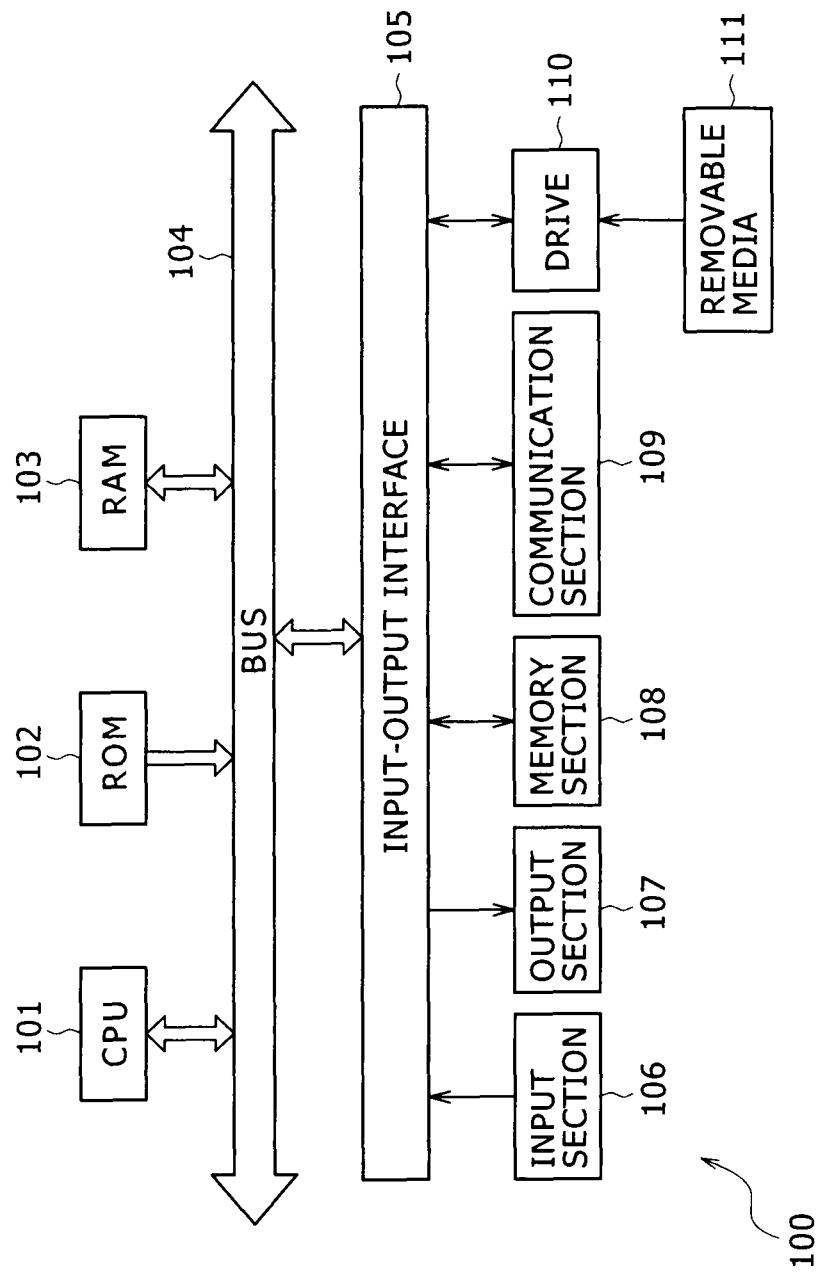

INFORMATION PROCESSING APPARATUS AND INFORMATION PROCESSING METHOD AND PROGRAM FOR THEM

BACKGROUND

The present disclosure relates to an information processing apparatus and an information processing method and a program for them, which are intended to improve doctors' efficiency in diagnosis.

One of the common practice employed in the medical field has been a diagnosis based on medical photographic images of patients' organs.

An example of such diagnosis is so-called virtual microscopic system disclosed in Japanese Patent Laid-open No. Hei 9-281405. It is intended to photograph divided small regions through a high-resolution object lens and subsequently join the thus photographed images together to reconstruct a large image for observation. This system permits doctors to use image data for pathological diagnosis and also permits image data to be accumulated, copied, and shared among hospitals through the network.

Another method is disclosed in Japanese Patent Laid-open No. 2008-242984 listed below for providing the medical image with image inspection processing information which permits one to acquire information about image inspection.

Japanese Patent Laid-open No. 2010-33476 and Japanese Patent Laid-open No. 2004-33539 listed below disclose the method for rearranging medical images and medical information in chronological order so that the rearranged images and information are used to easily observe change with time.

There is disclosed in Japanese Patent Laid-open No. 2009-175040 listed below another method for image processing, which is designed to detect the region of interest for the pathological doctor in the images of pathological tissues and then photograph with a high magnification the surroundings of the thus detected region of interest.

SUMMARY

Unfortunately, medical images according to the related-art technologies mentioned above do not permit a doctor to make a diagnosis efficiently because they are not arranged in the order of priority.

The present disclosure was completed in view of the foregoing. It is a desire of the present disclosure to provide an information processing apparatus and an information processing method and a program for them, which are designed to rearrange medical images in the order of priority so as to improve doctors' efficiency in diagnosis.

According to an embodiment of the present disclosure, there is provided an information processing apparatus including: a lesion progress rate recognition section configured to perform prescribed image recognition processing on a plurality of entered medical images, thereby recognizing the lesion progress rate that represents the rate of progress of the disease-induced change in living body; and a presentation control section configured to cause a presentation section to present the medical images according to the lesion progress rate which has been recognized by the lesion progress rate recognition section.

According to another embodiment of the present disclosure, there is provided an information processing method executed by the information processing apparatus having a lesion progress rate recognition section configured to perform prescribed image recognition processing on a plurality of entered medical images, thereby recognizing the lesion progress rate that represents the rate of progress of the disease-induced change in living body, and a presentation control section configured to cause a presentation section to present the medical images according to the lesion progress rate which has been recognized by the lesion progress rate recognition section. The method includes: performing prescribed image recognition processing on a plurality of entered medical images, thereby recognizing the lesion progress rate that represents the rate of progress of the disease-induced change in living body; and causing a presenting section to present the medical images according to the lesion progress rate which is recognized by the lesion progress rate recognition section.

According to further embodiment of the present disclosure, there is provided a program for causing a computer to execute a process executed by the information processing apparatus having a lesion progress rate recognition section configured to perform prescribed image recognition processing on a plurality of entered medical images, thereby recognizing the lesion progress rate that represents the rate of progress of the disease-induced change in living body, and a presentation control section configured to cause a presentation section to present the medical images according to the lesion progress rate which has been recognized by the lesion progress rate recognition section. The process includes performing prescribed image recognition processing on a plurality of entered medical images, thereby recognizing the lesion progress rate that represents the rate of progress of the disease-induced change in living body, and causing a presenting section to present the medical images according to the lesion progress rate which is recognized by the lesion progress rate recognition section.

The present disclosure will improve the doctors' efficiency in diagnosis.

BRIEF DESCRIPTION OF THE DRAWINGS

FIG. 16 is a diagram showing an example of the configuration of the computer.

DETAILED DESCRIPTION OF THE PREFERRED EMBODIMENTS

The following is a description of the embodiments to practice the present disclosure. The description develops in the sequential order shown below.
1. Embodiments
2. Modified embodiments

1. Embodiments

Structure of the Medical Image Processing Apparatus

Figure 1:
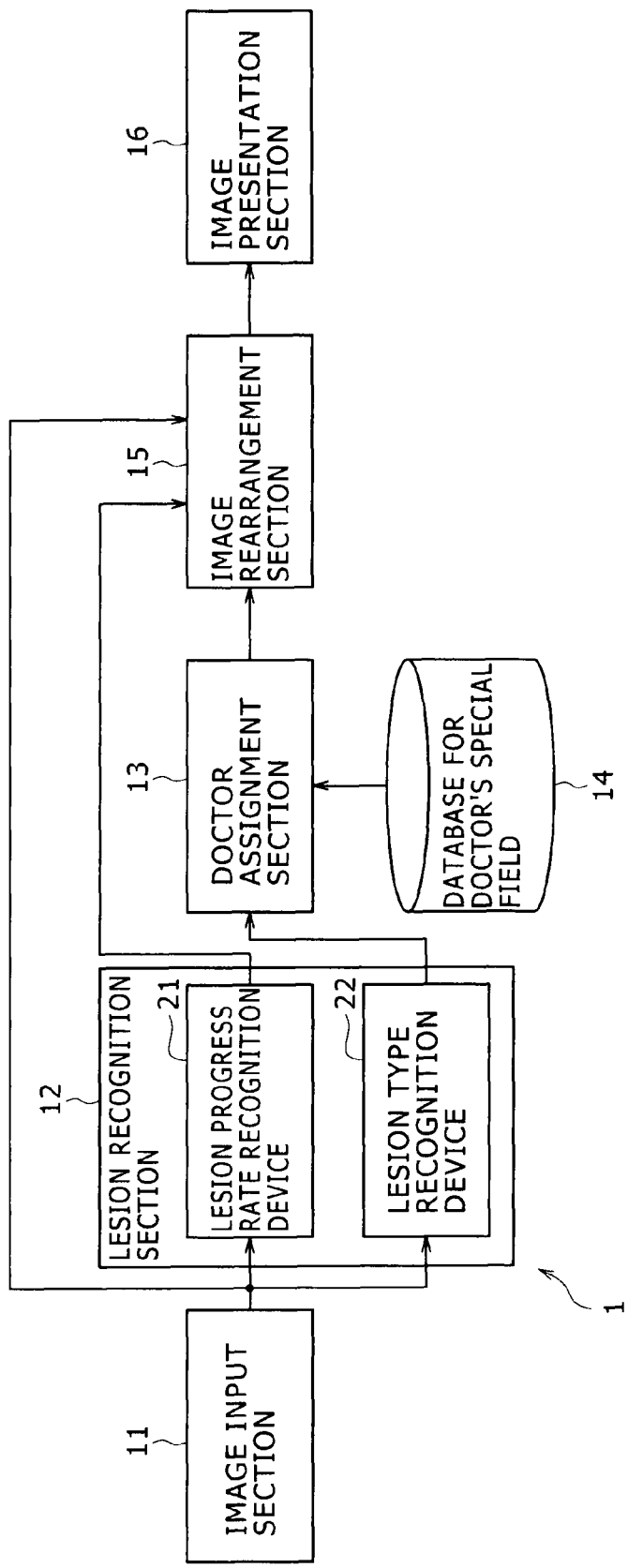
FIG. 1 is a diagram illustrating the structure of the medical image processing apparatus according to one embodiment of the present disclosure.

FIG. 1 is a diagram illustrating the structure of the medical image processing apparatus according to one embodiment of the present disclosure.

The medical image processing apparatus 1 is composed of the image input section 11, the lesion recognition section 12, the doctor assignment section 13, the database for doctor's special field 14, the image rearrangement section 15, and the image presentation section 16.

The image input section 11 sequentially acquires a plurality of medical images that have been entered and then sends them to the lesion recognition section 12 and the image rearrangement section 15.

Incidentally, the medical images may be any images which are used for diagnosis by the doctor. They include, for example, pathological images which are used for pathological diagnosis by the pathological doctor and CT (Computed Tomography) images which show any of patients organs. It is assumed that this embodiment employs medical images photographed for cancer diagnosis.

The lesion recognition section 12 performs a series of image recognition processing (referred to as lesion recognition processing hereinafter) on the medical images which are sequentially supplied from the image input section 11, thereby recognizing the rate of progress of disease-induced change in living body (or the progress rate of cancer) and the lesion type that represents the type of disease (or the type of cancer).

The lesion recognition section 12 is composed of the lesion progress rate recognition device 21 and the lesion type recognition device 22. Incidentally, the lesion progress rate recognition device 21 and the lesion type recognition device 22 are generated by previous learning according to a prescribed algorithm that employs learning samples. A detailed description of this will be given later.

The lesion progress rate recognition device 21 recognizes the lesion progress rate from the medical images sequentially supplied from the image input section 11 and sends the results of recognition to the image rearrangement section 15.

The lesion type recognition device 22 recognizes the lesion type from the medical images sequentially supplied from the image input section 11 and sends the results of recognition to the doctor assignment section 13.

The doctor assignment section 13 assigns the doctor in charge of medical images corresponding to the lesion type in response to the result of recognizing the lesion type supplied from the lesion type recognition device 22 and in reference to the database for doctor's special field 14 that defines the doctor's special field. Subsequently, the doctor assignment section 13 sends the result of assignment for the doctor in charge of diagnosis of the lesion to the image rearrangement section 15.

The image rearrangement section 15 is supplied with the result of recognition of the lesion progress rate from the lesion progress rate recognition device 21 and with the result of assignment of the doctor in charge from the doctor assignment section 13 in response to the medical images which are sequentially supplied from the image input section 11.

The image rearrangement section 15 rearranges the medical images for the assigned doctor in charge in a prescribed order based on the result of recognition of the lesion progress rate and the assignment of the doctor in charge. Subsequently, it sends the results to the image presentation section 16.

The image presentation section 16 sequentially presents the medical images which are supplied from the image rearrangement section 15 after rearrangement in a prescribed order.

The foregoing is a description of the structure of the medical image processing apparatus 1.

[Processing for Presentation of Medical Images]

The medical image processing apparatus 1 shown in FIG. 1 executes the processing for presentation of medical images in the following way which is explained with reference to the flow chart shown in FIG. 2.

In Step S11, the image input section 11 sequentially acquires a plurality of medical images which have been entered.

In Step S12, the lesion recognition section 12 performs the processing of lesion recognition on the medical images which have been sequentially acquired from the image input section 11.

The processing for lesion recognition which is carried out in Step S12 shown in FIG. 2 will be explained here with reference to the flow chart shown in FIG. 3.

In Step S31, the lesion progress rate recognition device 21 recognizes the lesion progress rate from medical images.

The recognition of the lesion progress rate is accomplished by the method which will be described in detail below.

The lesion progress rate recognition device 21 recognizes the lesion progress rate because it is previously formed by learning the feature amount of brightness difference in the statistical way.

The feature amount of brightness difference is obtained by calculating the difference in brightness between prescribed individual pairs in a pixel block. The statistical way of learning denotes learning that employs boosting algorithm to be performed on medical images (sample images) which have previously been correctly answered (labeled). The feature amount of brightness difference is one example of the amount of statistical image features.

A detailed description of the feature amount of brightness difference and the statistical way of learning is disclosed in Japanese Patent Laid-open No. 2005-284348 and others.

Figure 4:
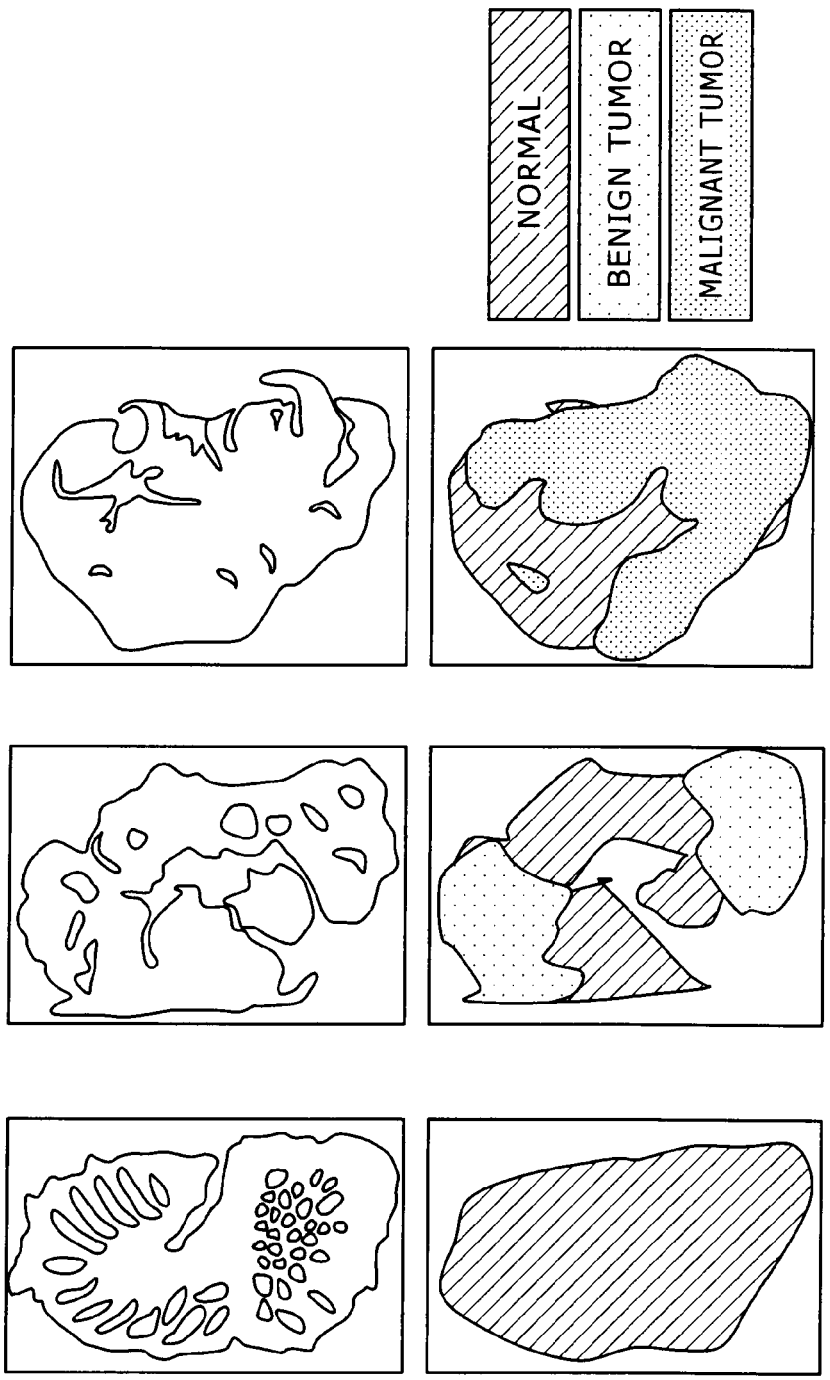
FIG. 4 is a diagram showing the relation between the medical images and the label for the lesion progress rate.

To be more specific, the foregoing process proceeds as follows. The learning machine (not shown) prepares the database for learning samples, which include medical images (sample images) and labels (corresponding to the medical images) which indicate the lesion progress rate (label for the lesion progress rate), as shown in FIG. 4. FIG. 4 demonstrates that medical images are given three kinds of labels for lesion progress rate, such as normal, benign tumor, and malignant tumor. The learning machine applies the statistical learning method (mentioned above) to the combination of their medical images and the labels for the lesion progress rate so as to generate the lesion progress rate recognition device 21. The lesion progress rate recognition device 21 permits one to recognize the lesion progress rate for any arbitrary medical image.

Figure 5:
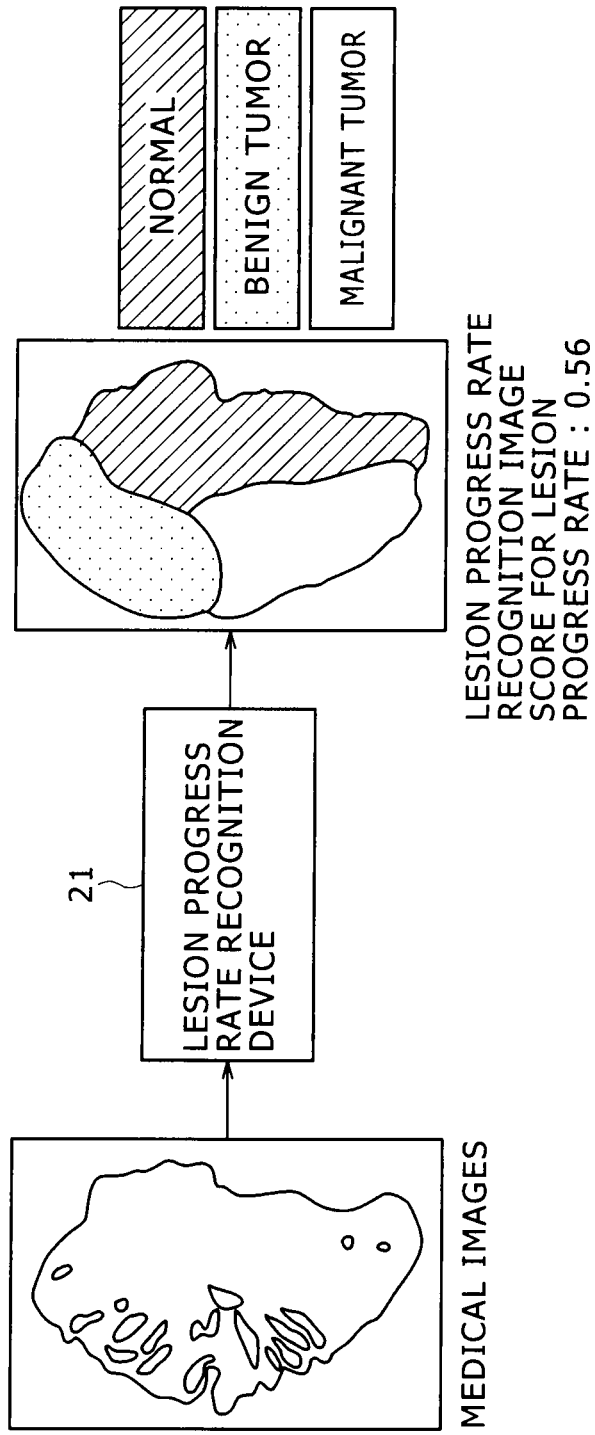
FIG. 5 is a diagram showing in detail the processing by the device to recognize the lesion progress rate.

The example shown in FIG. 5 demonstrates that the lesion progress rate recognition device 21 outputs each pixel of the medical image for the three confidence factors for normal, benign tumor, and malignant tumor which have values in the range of [0.0, 1.0]. In the case of the examples shown in FIG. 5, the dark color denotes the portion with a high confidence factor. In the case shown in FIG. 5, the lesion progress rate recognition device 21 yields 0.56 as the score for the lesion progress rate for any arbitrary medical image; this score may be calculated in either of the following two ways (A) and (B).

(A) Method for Averaging in Terms of the Area of the Region Recognized

This method assumes that the score of normal is 0, the score for benign tumor is 0.5 and the score for malignant tumor is 1.0, and performs weighted average calculations on the foregoing scores in terms of confidence factor for all the pixels of the tissue part in the medical images. In other words, the score S for the lesion progress rate in each medical image is calculated according to the following formula.

$$S = 1/N \times \Sigma(SNi \times CNi + SBi \times CNi + SMi \times CMi) \quad (1)$$

Incidentally, in the formula (1), N denotes the number of pixels in the tissue part, and $\Sigma$ the sum of pixels i belonging to the region of the tissue part. Also, SNi denotes the normal score, CNi the normal confidence factor, SBi the score for benign tumor, CNi the confidence factor for benign tumor, SMi the score for malignant tumor, and CMi the confidence factor for malignant tumor.

The method for calculations according to the formula (1) gives a small value of score S for the lesion progress rate even in the case of malignant tumor so long as its area is small. Accordingly, the method for calculations according to the formula (1) is suitable for those objects in which the area of tumor is associated with the lesion progress rate.

(B) Method for Using the Maximum Value

This method is designed such that the maximum value of the scores of the detected lesion progress rate is regarded as the score S of the lesion progress rate of the medical image. In other words, this method employs the formula (2) below to calculate the score S for the lesion progress rate in one sheet of medical image.

$$S = MAX(SB \times CN + SM \times CM) \quad (2)$$

Incidentally, MAX( ) in the formula (2) above denotes a function that gives the maximum value in the parenthesis ( ), that is, the maximum value of (SB×CN+SM×CM) which is the sum of multiples of the score and the confidence factor for each of benign tumor and malignant tumor.

The method for calculations according to the formula (2) gives a high value of score S for the lesion progress rate even in the case there exists a malignant tumor with a high confidence factor but its area is small. This means that the method for calculations according to the formula (2) is suitable for those objects in which the lesion progress rate is high if there exists a malignant tumor, regardless of its area.

Incidentally, the formulas (1) and (2) mentioned above are mere examples of methods for calculating the score S for the lesion progress rate; adequate methods for calculations should be selected according to the objects for which the score S for the lesion progress rate is to be calculated, such as the area of tumor and the lesion progress rate.

As mentioned above, the lesion progress rate recognition device 21 makes a comparison between the feature amount which has been learned by the learning samples provided with labels in advance and the feature amount of medical images, thereby giving an output of a value (score for the lesion progress rate) to estimate the lesion progress rate of any arbitrary medical image. For example, in the case of FIG. 5, the lesion progress rate recognition device 21 generates from medical imagers the image corresponding to the score of the lesion progress rate (which will be referred to as the lesion progress rate recognition image for hereinafter), and gives a value of 0.56 as the score for the lesion progress rate.

Figure 3:
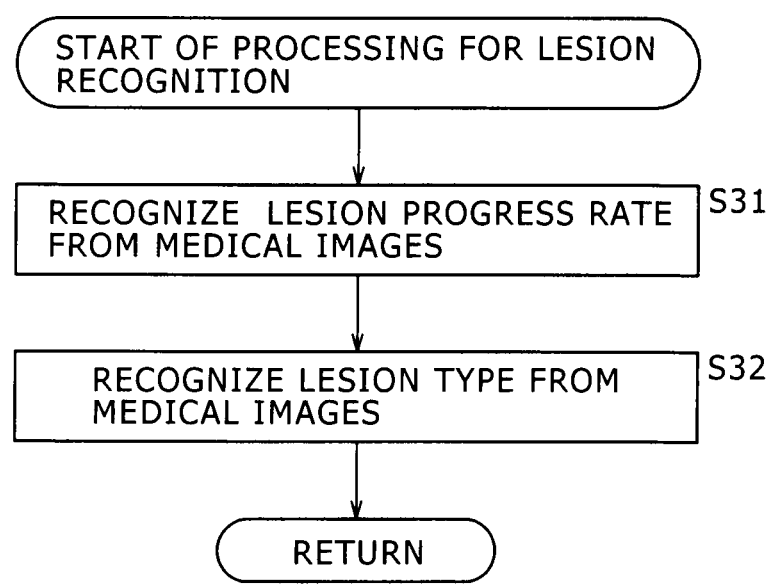
FIG. 3 is a flow chart showing in detail the flow of processing to recognize lesions.

The discussion returns to the flow chart shown in FIG. 3. In Step S32, the lesion type recognition device 22 recognizes the lesion type from the medical images.

The following is a detailed description of the method for recognizing the lesion type.

The lesion type recognition device 22 is previously allowed to learn by means of the feature amount of brightness difference and the statistical learning method in the same way as the method for recognition of the lesion progress rate as mentioned above, so that it recognizes the lesion type.

Figure 6:
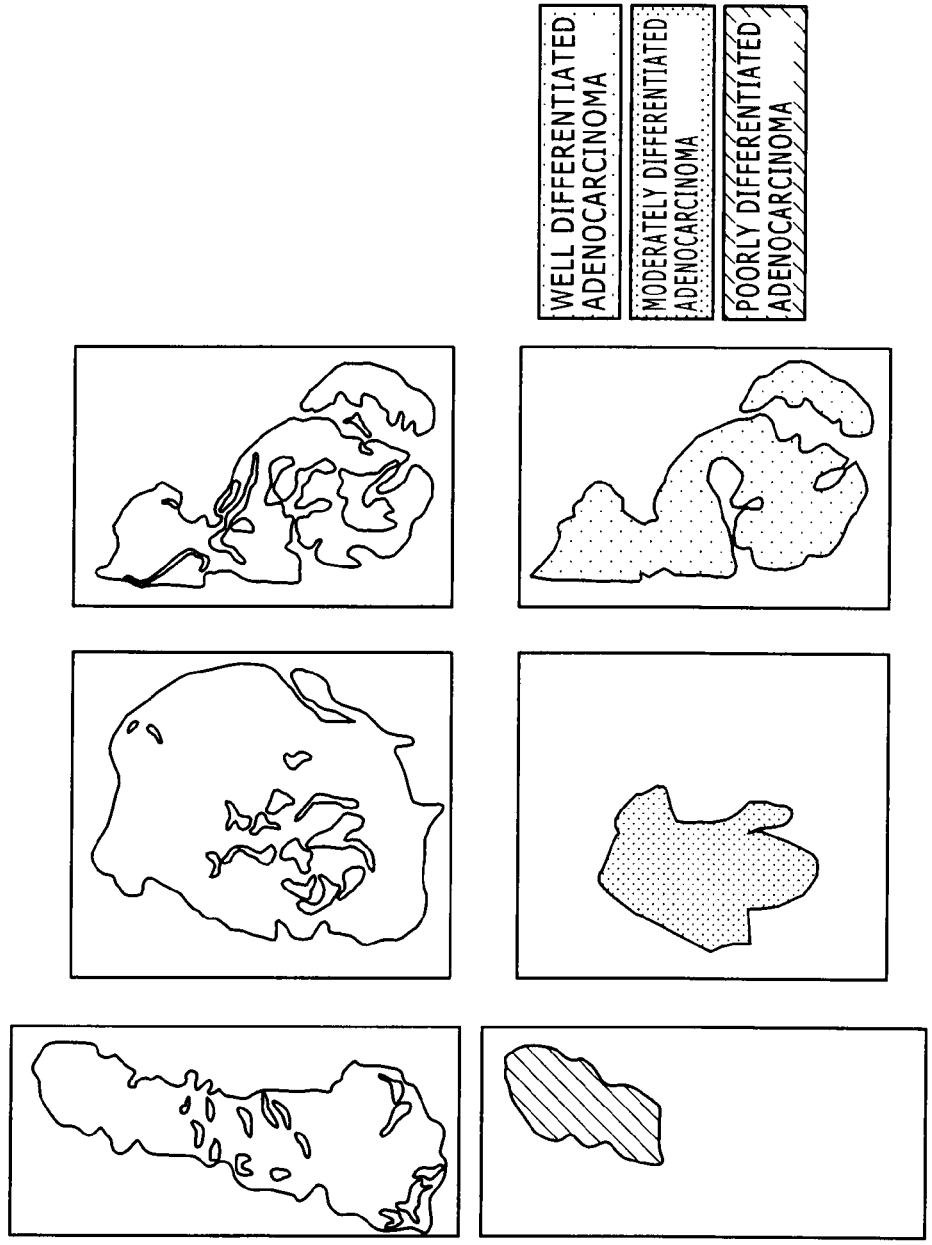
FIG. 6 is a diagram showing the relation between the medical images and the label for the lesion type.
Figures 7, 8:
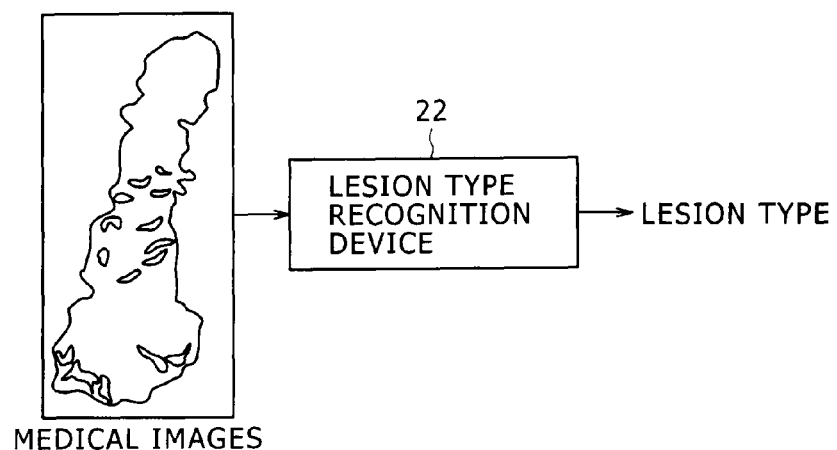
FIG. 7 is a diagram showing in detail the processing by the device to recognize the lesion type.
FIG. 8 is a diagram showing an example of the structure of the database for the doctor's special field.

To be more specific, the lesion type recognition device 22 is formed when the medical images (sample images) are given three kinds of lesion type labels representing well differentiated adenocarcinoma, moderately differentiated adenocarcinoma, and poorly differentiated adenocarcinoma and then the statistical learning method (mentioned above) is applied to the combination of their medical images and the lesion type labels, as shown in FIG. 6. Thus, the lesion type recognition device 22 can be used to recognize the lesion type for any arbitrary medical image, as shown in FIG. 7.

Incidentally, an example illustrated as the lesion type in this embodiment includes three kinds of cancers, such as well differentiated adenocarcinoma, moderately differentiated adenocarcinoma, and poorly differentiated adenocarcinoma. Adenocarcinomas are usually classified by pathological histology into well differentiated adenocarcinoma, moderately differentiated adenocarcinoma, and poorly differentiated adenocarcinoma, and the last one is regarded as most difficult to treat.

Figure 2:
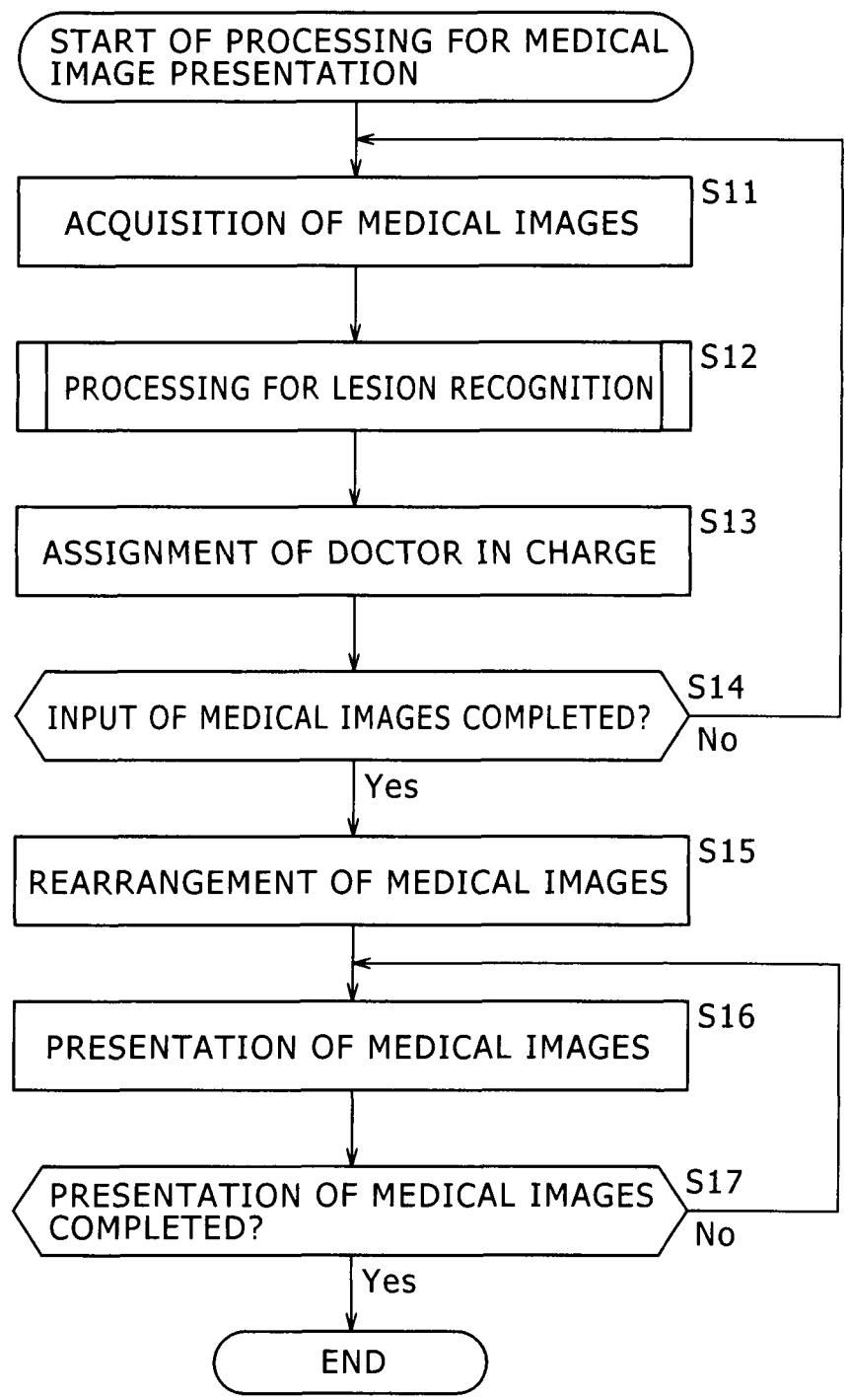
FIG. 2 is a flow chart showing the flow of processing to present medical images.

Thus, the lesion recognition section 12 executes the processing of lesion recognition, and upon recognition of the lesion progress rate and the lesion type, the processing returns to the flow chart shown in FIG. 2 and the processing in Step S13 and the subsequent steps is executed.

In Step S13, the doctor assignment section 13 assigns the doctor in charge of the medical image corresponding to the lesion type according to the lesion type informed by the lesion type recognition device 22 and also according to the special field and the level of skill of the doctor which are stored in the database for doctor's special field 14.

FIG. 8 is a diagram showing an example of the database for the doctor's special field 14.

As shown in FIG. 8, the database for the doctor's special field 14 stores the information about the special field and the level of skill of the individual doctors in association with their names. The level of skill is rated in 10 degrees. The smaller the number of degree, the higher the level of skill.

For example, Dr. A is specialized in epithelial and moderately differentiated and has a level of skill rated as 5. Dr. B and Dr. E are also specialized in epithelial but are different in the level of skill. Dr. E has the highest level of skill, and Dr. B has the lowest level of skill. Dr. C is specialized in mesenchymoma and Dr. D is specialized in malignant lymphoma, and their level of skill is 7 and 1, respectively.

Incidentally, the database for doctor's special field 14 may be constructed as the user directly enters such items as the name, the special field, and the level of skill of the doctor or may be constructed from patients' charts containing case information about past diagnosis.

For example, when the lesion type recognition device 22 recognizes poorly differentiated adenocarcinoma from the medical images, the doctor assignment section 13 finds out a doctor specialized in poorly differentiated adenocarcinoma from the registered doctors by reference to the database for doctor's special field 14. In the case of FIG. 8, Dr. E is assigned as the doctor in charge because he or she is specialized in poorly differentiated adenocarcinoma.

If there are two or more doctors specialized in poorly differentiated adenocarcinoma, the one who has the highest level of skill is assigned as the doctor in charge, as mentioned above. Because of this system, the medical images for cases that have a high lesion progress rate and need rapid diagnosis are delivered to the doctors with a high level of skill. This improves the efficiency of diagnosis throughout the hospital.

The process returns to the flow chart shown in FIG. 2. In Step S14, a judgment is made as to whether or not the input of medical images has been completed. If the result of judgment is no, the process returns to Step S11, and the Steps S11 to S14 are repeated.

During repetition of Steps S11 to S14, the process for lesion recognition is performed on the sequentially entered medical images so that the lesion progress rate and the lesion type are recognized and the score for the lesion progress rate is associated with individual medical images and the doctor is assigned according to the lesion type.

In this way, correspondence is made between the score for the lesion progress rate and the doctor in charge for all of the medical images entered. Step S14 proceeds to Step S15 when it makes a judgment that the input of medical images has been completed.

In Step S15, the image rearrangement section 15 rearranges the medical images entered from the image input section 11 in a prescribed order according to the lesion progress rate (supplied from the lesion progress rate recognition device 21) for each doctor assigned by the doctor assignment section 13.

In Step S16, the image presentation section 16 presents the medical images which have been rearranged in a prescribed order by the image rearrangement section 15.

In Step S17, a judgment is made as to whether or not the presentation of the rearranged medical images is complete. If the result of judgment is no, the process returns to Step S16 and Steps S16 and S17 (mentioned above) are repeated.

During repetition of Steps S16 and S17, the medical images (which have been rearranged in a prescribed order) are sequentially presented by the operation of the doctor in charge, so that the doctor in charge can perform diagnosis by using the sequentially presented medical images.

In Step S17, after all of the rearranged medical images have been presented, a judgment is made as to whether or not the presentation of the medical images is completed, so that the process of presenting the medical images is completed as shown in FIG. 2.

[Example of Rearrangement of Medical Images]

Figure 9:
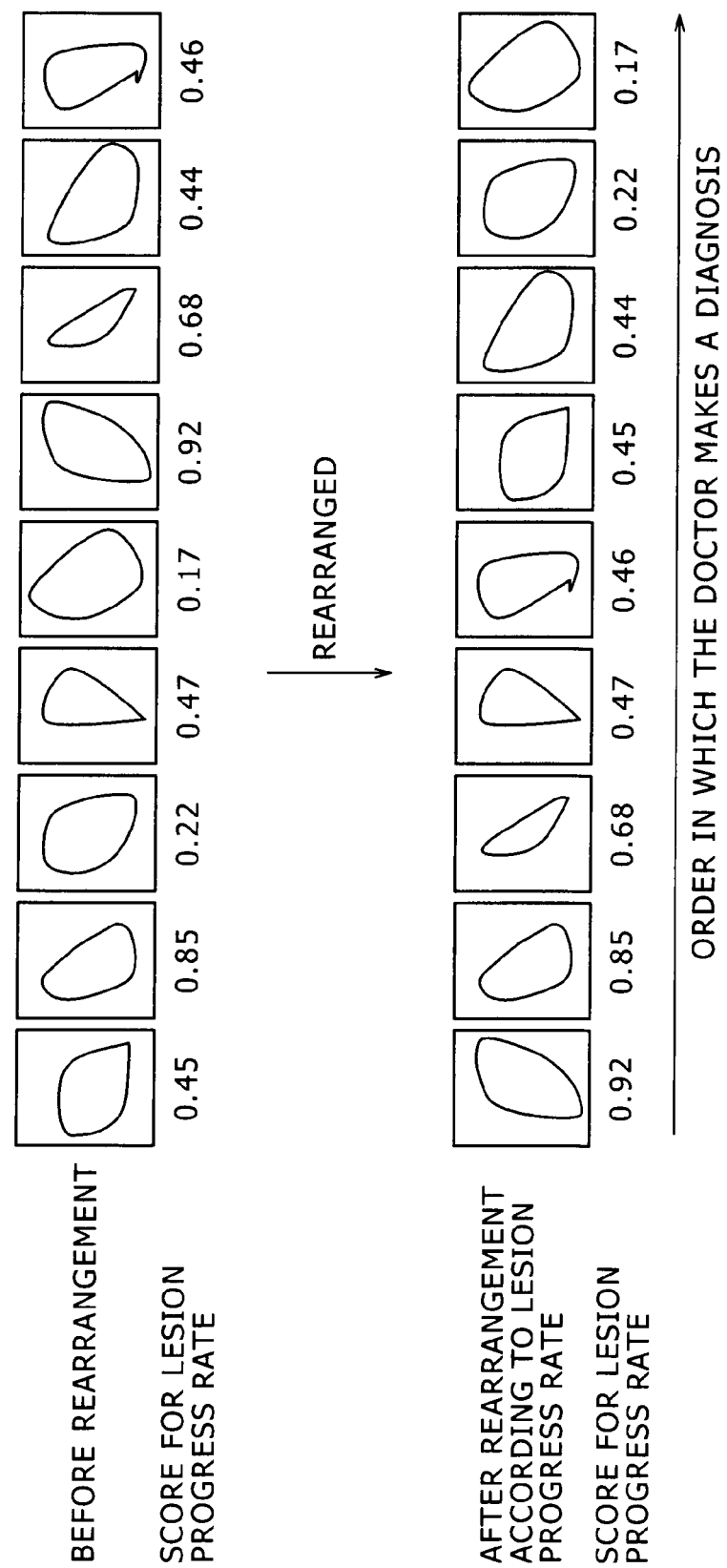
FIG. 9 is a diagram showing an example of the rearrangement of medical images (in the order of the lesion progress rate)
Figure 10:
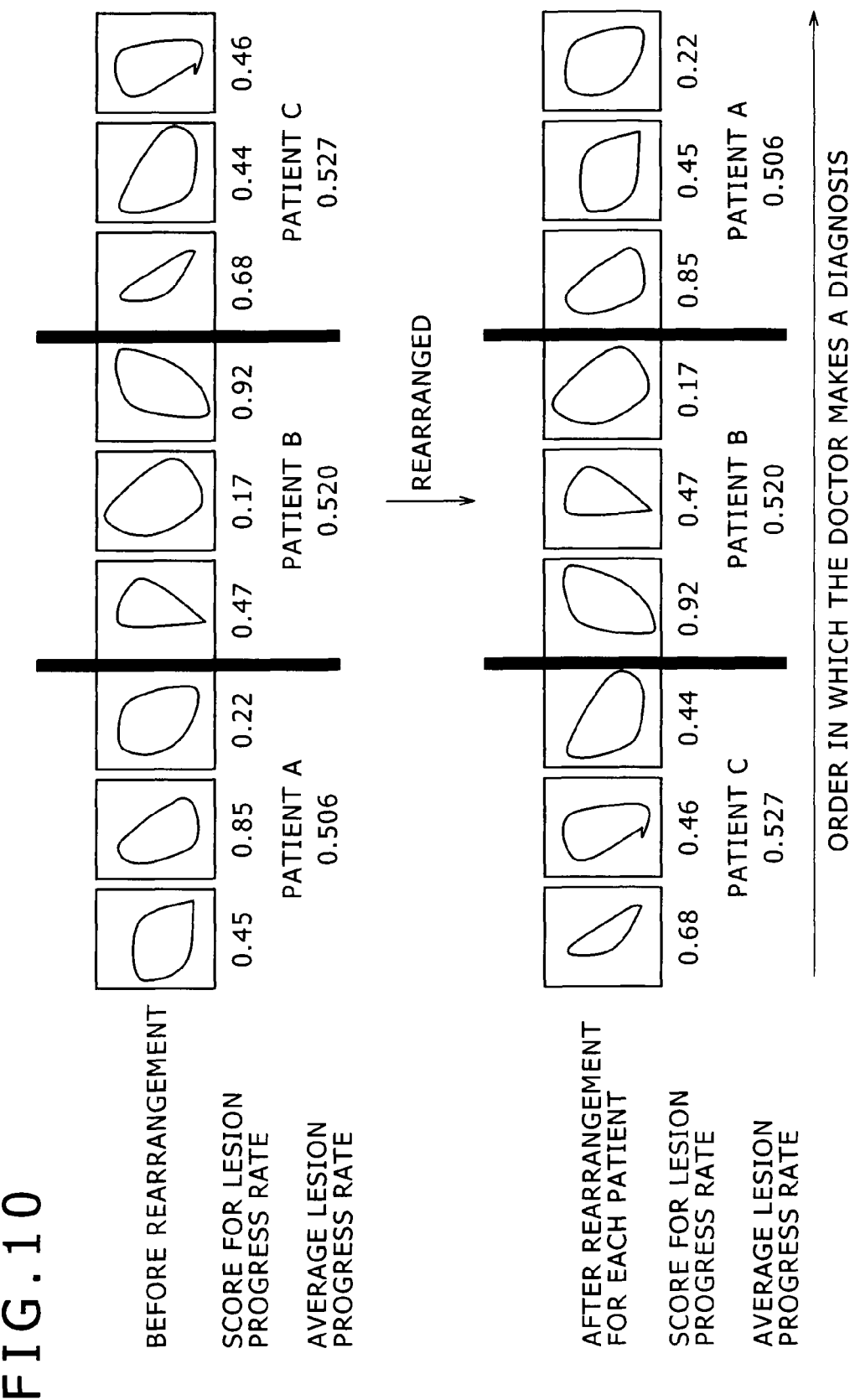
FIG. 10 is a diagram showing an example of the rearrangement of medical images (for individual patients rearranged according to the average value of the lesion progress rate)
Figure 11:
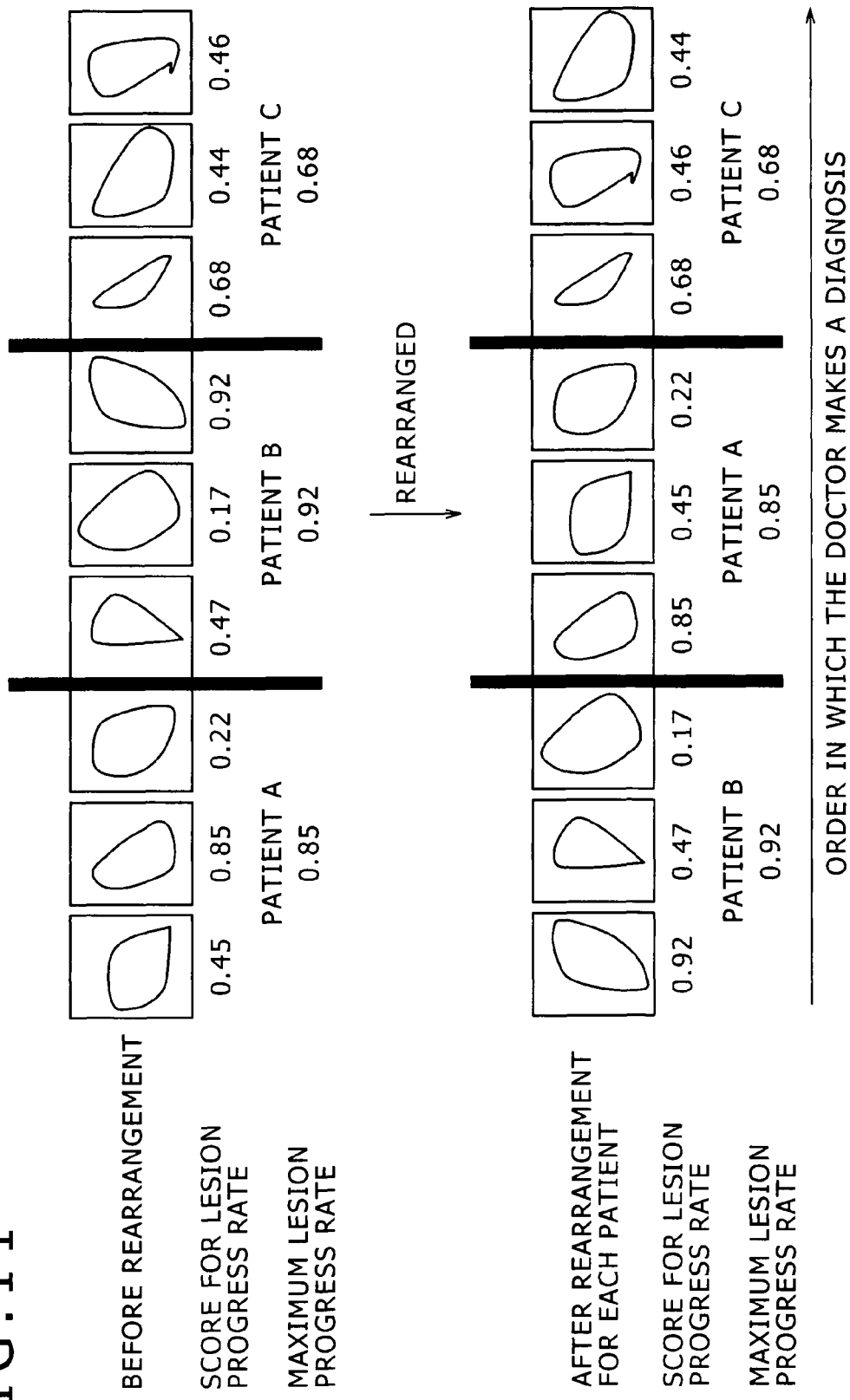
FIG. 11 is a diagram showing an example of the rearrangement of medical images (for individual patients rearranged according to the maximum value of the lesion progress rate)

Here, referring to FIGS. 9 to 11, an example of the rearrangement of medical images carried out by the image rearrangement section 15 is described.

FIG. 9 shows an example of the medical images which have been rearranged in the descending order of the score for the lesion progress rate.

FIG. 9 contains two rows of nine medical images arranged in the upper and lower parts. Each medical image schematically shows the sections corresponding to the medical image shown in FIG. 5. This description of the medical image is applicable to other images mentioned later.

The upper row in FIG. 9 represents the medical images which have been arranged in the order of entry, and the lower row in FIG. 9 represents the medical images which have been rearranged in the descending order of the score for the lesion progress rate.

It is to be noted that the medical images are originally arranged in the order of entry, such that their score for the lesion progress rate appears in the order of 0.45, 0.85, 0.22, 0.47, 0.17, 0.92, 0.68, 0.44, and 0.46. After rearrangement, the medical images form in line such that their score for the lesion progress rate appears in the order of 0.92, 0.85, 0.68, 0.47, 0.46, 0.45, 0.44, 0.22, and 0.17.

The medical images having the high score for the lesion progress rate are likely to contain the lesion in them. Therefore, if the doctor examines the medical images, which have been rearranged in the descending order of the lesion progress rate as shown in the lower row, he or she will be able to perform adequate treatment in an early stage.

FIGS. 10 and 11 show respectively the case in which the medical images have been rearranged for each patient according to the lesion progress rate.

Incidentally, if medical images are to be rearranged for individual patients, it is necessary to have information to specify patients for which the medical images are photographed. This information will be referred to as patient information hereinafter. This patient information may be acquired by previously attaching meta data (such as patient properties to specify patients) to the medical images to be entered. In this way the image rearrangement section 15 can acquire the patient's properties (patient information) attached to the medical images when the medical images are rearranged and hence it becomes possible to rearrange the medical images for individual patients.

There are other methods of acquiring patient information than attaching meta data as mentioned above. For example, the user may directly input the patient information into the medical images to be entered.

In the case of FIG. 10, the medical images are rearranged in the order of patients according to their average lesion progress rate (in terms of score) which has been previously obtained for individual patients.

The nine medical images in the upper row in FIG. 10 are arranged for three patients A, B, and C. In the lower row, they are rearranged in the order of the patients having the average high lesion progress rate.

That is, paying attention to the average lesion progress rate for each patient, the medical images may be rearranged in the descending order of the average lesion progress rate for patient C, patient B, and patient A because these patients A, B, and C have the average lesion progress rate of 0.506, 0.520, and 0.527, respectively. The medical images for each patient may also be rearranged in the descending order of the lesion progress rate.

On the other hand, in the case of FIG. 11, the medical images are rearranged in the order of patients having the maximum lesion progress rate which has been obtained previously from the score for the lesion progress rate of each patient.

That is, paying attention to the maximum lesion progress rate for each patient, the medical images may be rearranged in the descending order of the maximum lesion progress rate for patient B, patient A, and patient C because these patients, A, B, and C have the maximum lesion progress rate of 0.85, 0.92, and 0.68, respectively. As in the case of FIG. 10, the medical images for each patient may also be rearranged in the descending order of the lesion progress rate.

As mentioned above, it is possible to rearrange the medical images for individual patients by utilizing, as the condition for rearrangement, the patient information in addition to the score for the lesion progress rate mentioned above.

By rearranging the medical images as mentioned above, the doctor can make a diagnosis, with the help of medical images having the high lesion progress rate, preferentially for those patients who might have the lesion because usually one patient has more than one medical image. In this way, it is possible to find the lesion early and to improve the efficiently of diagnosis.

Incidentally, the lesion progress rate may be calculated in various ways; its average value, maximum value, or others may be obtained depending on the characteristic properties of the medical images to be used.

Meanwhile, the doctor needs for diagnosis the information about the region where the cell tissue has been sampled. Diagnosis in the medical site is usually carried out for each sampled region and hence the efficiency of the doctor's diagnosis will be improved if the medical images are rearranged according to sampled regions. Thus, the rearrangement of medical images according to the sampled regions will be described below with reference to FIGS. 12 to 15.

Figure 12:
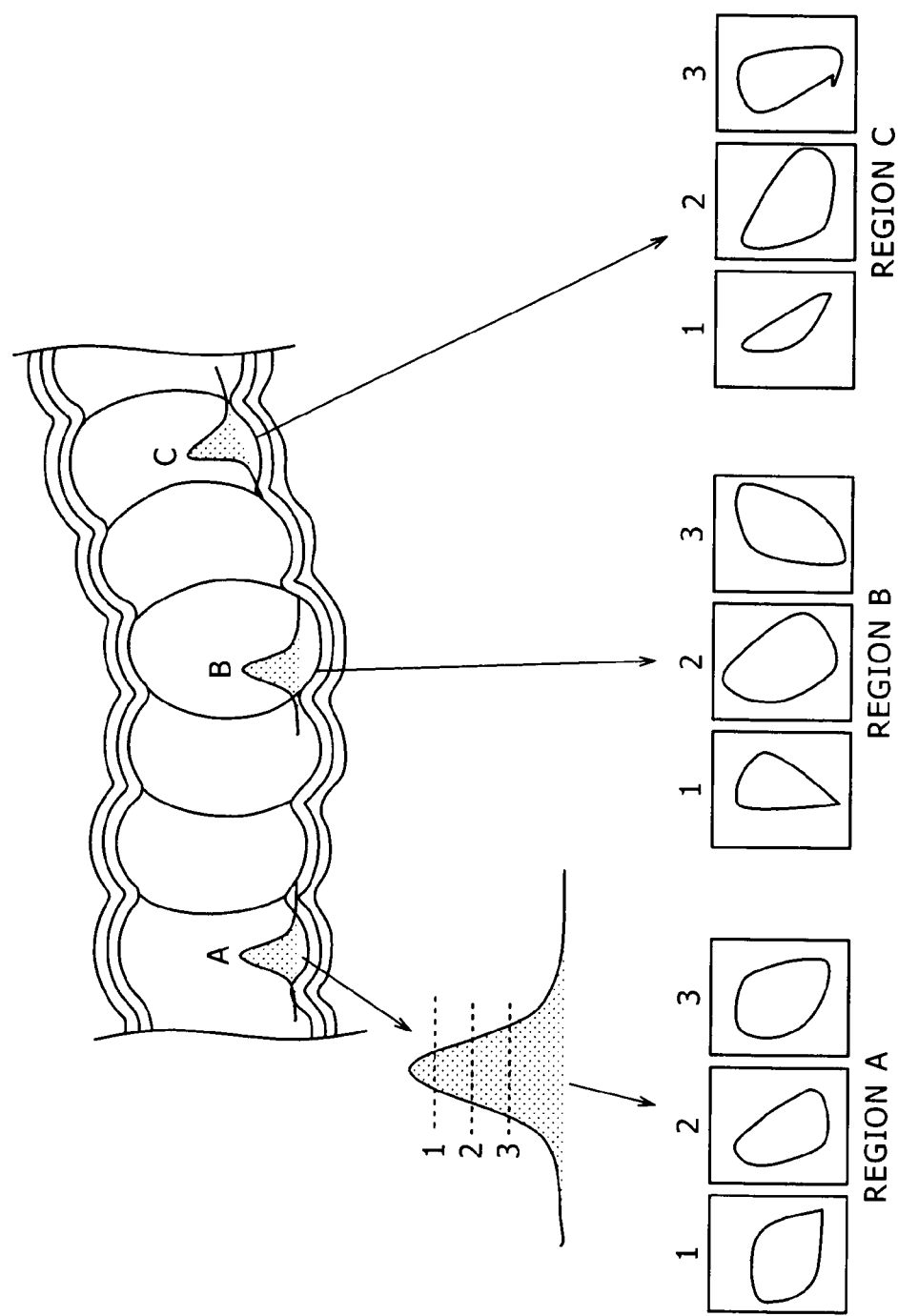
FIG. 12 is a diagram illustrating the outline of the rearrangement for sampled regions.

FIG. 12 is a diagram illustrating the concept of correspondence between the region at which the polyp in the large intestine has been sampled and the medical image of the preparation of the thus sampled cell tissue.

The upper part of FIG. 12 shows the cross section of the large intestine which has three polyps. The regions for sampling are referred to as region A, region B, and region C (from left to right). The cell tissue in each region is cut horizontally at three positions. The position for cutting is referred to as position 1, position 2, and position 3 (in the downward direction). The cell tissue in region A gives three medical images of its preparations, as shown in the lower part of FIG. 12. Similarly, three each of medical images are obtained from the cell tissues in regions B and C. As the result, there are obtained nine medical images in total from the regions A to C.

In the following description, the cutting position of each region is identified as A1, A2, and A3 for region A, B1, B2, and B3 for region B, and C1, C2, and C3 for region C.

In order to rearrange the medical images for individual sampling regions, one needs the information to specify the sampling region for the medical image. This information will be referred to as sampling region information hereinafter. The sampling region information may be obtained by previously attaching meta data such as the properties of sampling region which specify the sampling region to the medical images to be entered. This method permits the image rearrangement section 15 to acquire the sampling region information attached to the medical image at the time of rearrangement so that the medical images are rearranged for each sampling region.

There is other way of obtaining the sampling region information than attaching meta data to the medical image as mentioned above. According to this method, the user may directly input the sampling region information into the medical image to be entered.

Figure 13:
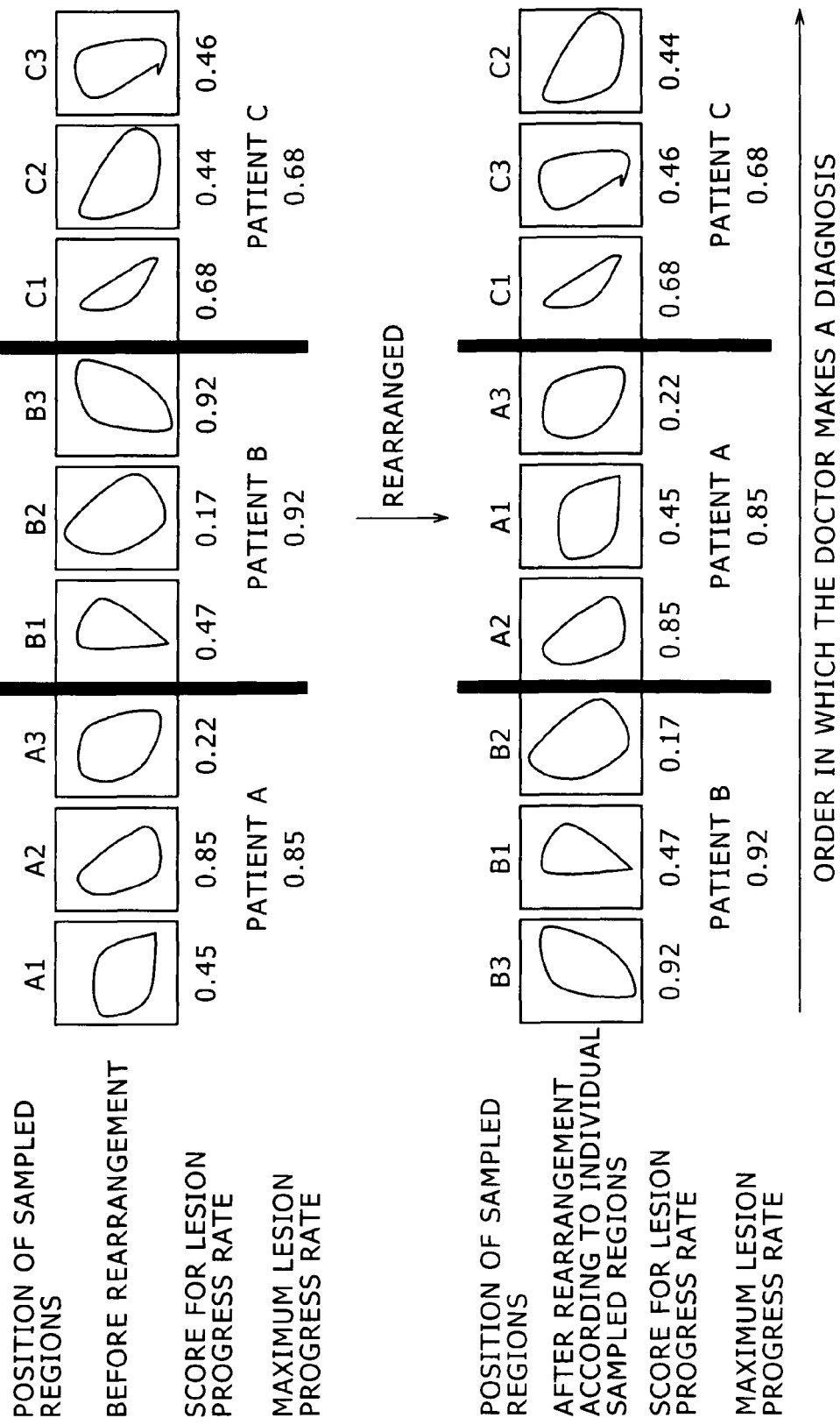
FIG. 13 is a diagram showing an example of the rearrangement of medical images (for sampled regions according to the maximum value of the lesion progress rate)
Figure 14:
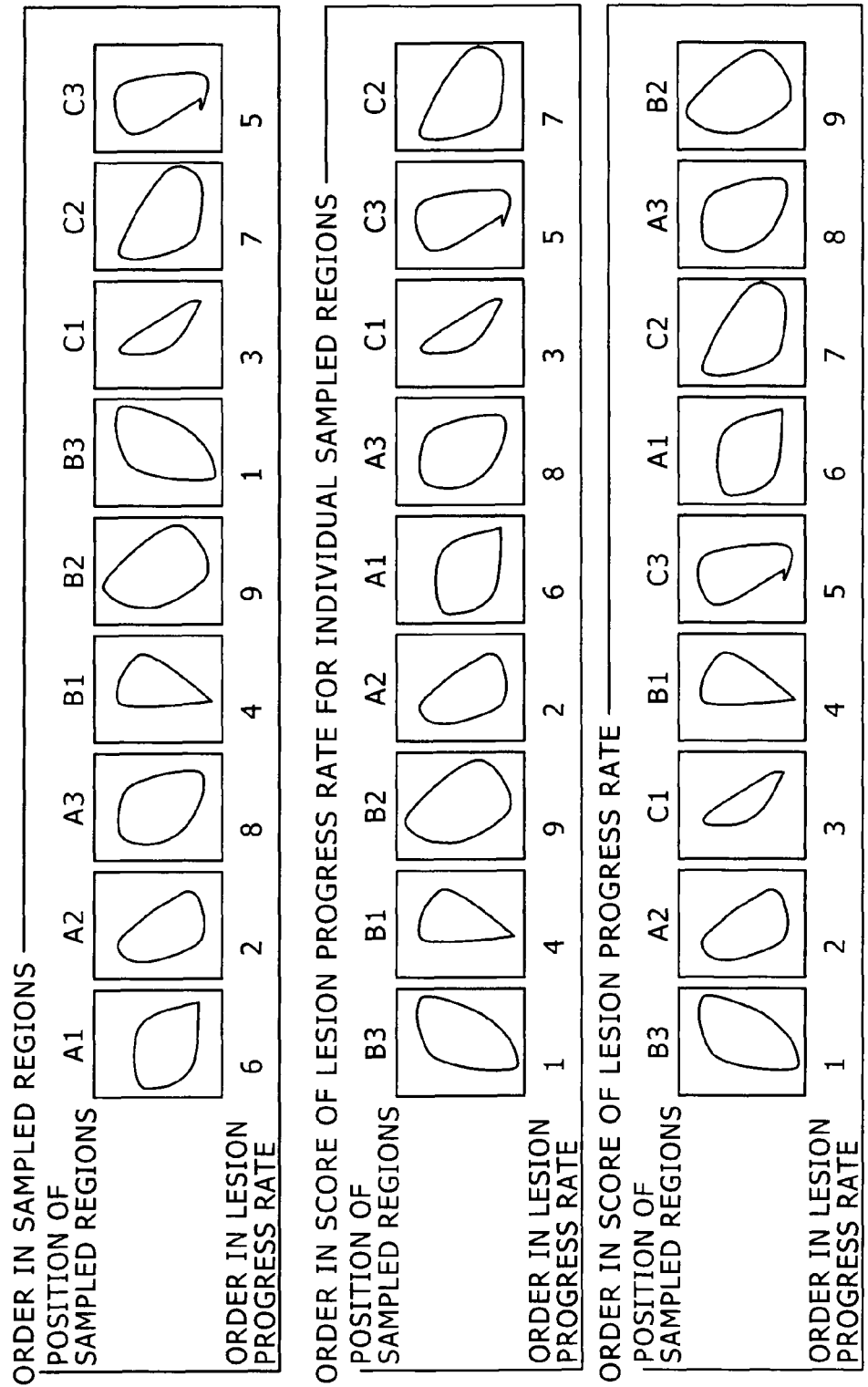
FIG. 14 is a diagram showing an example of switching the order of presentation of the medical images.
Figure 15:
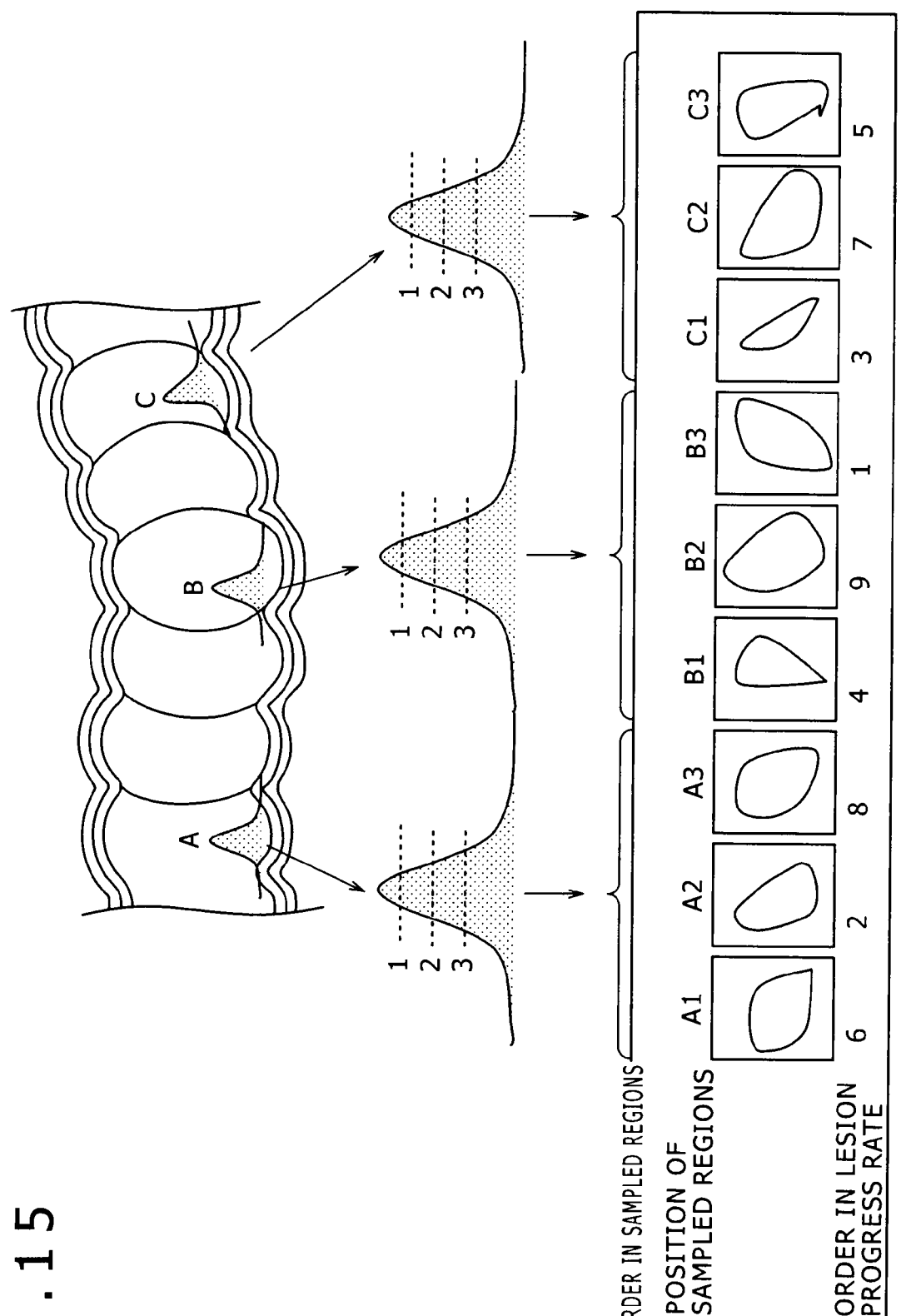
FIG. 15 is a diagram showing an example of presenting simultaneously the medical images and the images of sampled regions.

FIGS. 13 to 15 show an example of how to rearrange the medical images of one patient according to the lesion progress rate for each sampling region.

In FIGS. 13 to 15, the position of the sampling region (A1 to C3) is described above each medical image, and the order of the lesion progress rate which indicates the score or ranking of the lesion progress rate is described below each medical image.

FIG. 13 shows the case in which the medical images are rearranged in the descending order of the score for the lesion progress rate for each sampling region.

In FIG. 13, the upper row represents nine medical images which have been arranged in the order of entry or in the order of regions A, B, and C (before rearrangement) in each group of three. Then, the lower row represents the same nine medical images which have been rearranged according to the sampling regions.

That is, paying attention to the maximum lesion progress rate for sampling region, the medical images may be rearranged in the descending order of the maximum lesion progress rate for region A, region B, and region C because these regions have the maximum lesion progress rate of 0.85, 0.92, and 0.68, respectively. The medical images for each region may also be rearranged in the descending order of the lesion progress rate.

The method for rearrangement of medical images according to the lesion progress rate and the sampling region may be modified as shown in FIG. 14. In FIG. 14, the medical images are rearranged according to the order of sampling regions, the order of the score for the lesion progress rate for each sampling region, or the order of the score of the lesion progress rate.

Rearrangement of medical images in the upper row according to the order of the sampling regions may take place irrespective of the order of the lesion progress rate. That is, with attention paid to the sampling regions, the medical images may be rearranged in the order of the sampling regions A1, A2, A3, B1, B2, B3, C1, C2, and C3.

The medical images in the middle row are rearranged in the descending order of the lesion progress rate for the sampling regions. In addition, the medical images for each sampling region are also rearranged in the descending order of the lesion progress rate. Incidentally, the order of rearrangement is the same as that for each sampling region as in the case of FIG. 13 mentioned above.

Rearrangement of medical images in the lower row according to the order of the score of the lesion progress rate may take place in the descending order of the score of the lesion progress rate, irrespective of the sampling regions. With attention paid to the order of the lesion progress rate, the medical images may be rearranged in the order of the lesion progress rate 1 to 9.

As mentioned above, it is possible to rearrange the medical images for the sampling regions by using the sampling region information in addition to using the score for the lesion progress rate as the condition for rearrangement.

As shown in FIG. 14, the rearranged medical images carry the position of sampling regions and the order of the lesion progress rate; therefore, the doctor can confirm such orders to instantly grasp the order of rearrangement.

The images shown in FIG. 14 are those which have been rearranged in the order of sampling regions, in the order of the score of the lesion progress rate for each sampling region, or in the order of the score of the lesion progress rate. It is assumed that these orders can be set up by the doctor's operation.

The rearranged medical images shown in FIG. 15 may be presented such that the images rearranged according a prescribed order are associated with the sampling regions (such images will be referred to as sampling region images hereinafter).

In this case, the sampling region images corresponding to the region A include three medical images photographed at the sampling regions A1, A2, and A3 of the region A. The same is applied to the sampling region images photographed at the regions B and C.

In this way, the doctor can intuitively understand, by referencing the sampling region images, the part where the medical image he or she is watching was harvested. This is useful information for diagnosis.

Incidentally, in order to present the sampling region images, it is necessary to acquire the sampling region images corresponding to the medical images. The acquisition of the sampling region images may be achieved in the following way. When the medical images are acquired by the image input section 11, the corresponding sampling region images are also acquired and the medical images and their corresponding sampling images are sequentially supplied to the image rearrangement section 15.

The sampling region images may also be acquired in any other method than that which employs the image input section 11 (as mentioned above).

As mentioned above, the medical images which have been rearranged in a prescribed order according to the score of the lesion progress rate are presented and the medical images are presented in the order of their degree of priority. Consequently, the doctor can use the sequentially presented medical images to improve the efficiency of the diagnosis.

Due to such rearrangement, the doctor can examine preferentially those medical images which are likely to show lesion, so that he or she will find the lesion in an early stage. This permits the doctor to carry out timely treatment in an early stage. Moreover, it is possible to omit the diagnosis for the same patient after the finding of the lesion, and this saves time required for the doctor's diagnosis. This leads to improvement in the efficiency of the doctor's diagnosis.

Also, it is possible to rearrange the medical images for each patient by using the patient's information, and the doctor can start a diagnosis from the patient whose medical images show the maximum progress of lesion, so that the doctor can find the lesion in an early stage.

In addition, it is possible to rearrange the medical images for the sampling regions by using the sampling region information; therefore, the doctor can start examining the medical images from those which contain the regions in which the lesion has most progressed in each sampling region, so that the doctor can find the lesion in an early stage. Moreover, since the medical images for each sampling region are collected in one group, the doctor can easily carry out a diagnosis for that region.

It is possible to present the sampling region images that correspond to the sampling regions, in response to the medical images which have been rearranged for each sampling region, and therefore the doctor can reference the sampling region images so that he or she can intuitively understand the position at which the medical image he or she is examining was harvested.

In addition, when the medical images are distributed among doctors according to the case in which each doctor is specialized, it is possible to distribute them among doctors according to their level of skill; this contributes to the efficient diagnosis throughout the hospital.

2. Modified Embodiment

The embodiment mentioned above is designed such that the database for the doctor's special field 14 stores the doctor's level of skill and hence the doctor in charge is assigned according to his level of skill. Thus, a highly skilled doctor will be assigned for rare cases or difficult cases with an unclear boundary between benign tumor and malignant tumor.

The foregoing embodiment may be modified such that it is provided with an accumulating section (not shown) to store the medical images to be entered so that medical images are sequentially stored in it and the thus stored medical images are analyzed for cases. The thus obtained cases are compared with the cases of newly entered medical images. If the result of comparison indicates that the newly entered medical images are those of rare cases, a highly skilled doctor is assigned. Alternatively, a doctor may be assigned to a case which requires a slightly higher level of skill than he or she has, and this will help improve the doctor's skill.

In this way it is possible to assign a highly skilled doctor for difficult cases; and this contributes to the efficient diagnosis throughout the hospital.

The embodiment mentioned above is so designed as to calculate the score for the lesion progress rate based on the score for normal, benign tumor, and malignant tumor, and rearrange the medical images according to the score of the lesion progress rate. It may be modified such that the medical images are rearranged by using the information about possibility of tumor.

According to the thus modified embodiment, the lesion recognition section 12 performs a prescribed image recognition processing on the medical images which have been entered, calculates the possibility of the sampled region being benign tumor or malignant tumor, and further calculates the score for the lesion progress rate based on the result of such calculations. If, for example, the first medical image suggests that the possibility of the sampled region being benign tumor is 90% and the second medical image suggests that the possibility of the sampled region being malignant tumor is 50%, then rearrangement takes place such that the second medical images are presented preferentially to the first medical images.

In addition, the foregoing embodiment is so designed as to present the medical images (such as those shown in FIG. 5) as such; however, it may be so modified as to present the lesion progress rate recognition image (such as those shown in FIG. 5) which corresponds to the score of the rate of the lesion progress recognized by the lesion progress rate recognition device 21. In the case where the lesion progress rate recognition images are presented, they permit the doctor to immediately recognize the lesion progress rate, so that the doctor performs diagnosis preferentially over the regions having a high lesion progress rate, and this improves the efficiency of the doctor's diagnosis. On the other hand, in the case where the medical images are presented as such, there will be an instance in which the lesion progress rate recognition image corresponding to the score of the lesion progress rate which has been incorrectly recognized is obtained, if the lesion progress rate recognition device 21 is poor in accuracy of recognition. Presentation of incorrect lesion progress rate recognition images misleads the doctor's diagnosis, and hence it is desirable to presents medical images.

In addition, the modified embodiment is provided with the accumulating section (not shown) that stores the medical images so that the image rearrangement section 15 does not delete the rearranged images at the time of rearrangement of the medical images but have them stored in the accumulating section. In this way, it is possible to present the medical images before the lesion recognition processing is performed, even though there exist incorrect recognition in the lesion progress rate recognition device 21 and the lesion type recognition device 22. This reduces the possibility of the doctor overlooking the lesion and the like.

[Description of the Computer to which the Present Disclosure is Applied]

A series of processing mentioned above may be executed by either hardware or software. In the latter case, programs for the software may be installed into a dedicated computer or general-purpose computer from a program storage medium.

FIG. 16 shows an example of the structure of the computer designed to carry out the series of processing by means of program.

The computer 100 has CPU (Central Processing Unit) 101, ROM (Read Only Memory) 102, and RAM (Random Access Memory) 103, which are connected to one another through the bus 104.

The bus 104 is connected to the input-output interface 105. The input-output interface 105 is connected to an input section 106 such as a keyboard, mouse, and microphone, an output section 107 such as a display and speaker, a memory section 108 such as a hard disc and non-volatile memory, a communication section 109 such as a network interface, and a drive 110 to drive such removable media 111 as a magnetic disc, an optical disc, a magneto-optical disc, and a semiconductor memory.

The computer 100 constructed as mentioned above carries out the series of processing when the CPU 101 executes the program which has been loaded from the memory section 108 to the RAM 103 through the input-output interface 105 and the bus 104.

Incidentally, the steps that describe the programs to be executed by the computer may be processed serially in chronological order or parallel or even individually.

The embodiment of the present disclosure is not restricted to the one mentioned above, but it may be variously changed and modified within the scope of the present disclosure.

The present disclosure contains subject matter related to that disclosed in Japanese Priority Patent Application JP 2010-233279 filed in the Japan Patent Office on Oct. 18, 2010, the entire content of which is hereby incorporated by reference.

What is claimed is:

1. An information processing apparatus comprising:
    lesion progress rate recognition circuitry configured to perform prescribed image recognition processing on a plurality of entered medical images, thereby recognizing a lesion progress rate that represents a rate of progress of a disease-induced change in a living body, and calculate a score of the lesion progress rate as a function of (i) a number of pixels representing tissues in the medical images, (ii) a first product of a first score for normal tissues and normal confidence factors, (iii) a second product of a second score for benign tissues and benign confidence factors, and (iv) a third product of a third score for malignant tissues and malignant confidence factors; and
    presentation control circuitry configured to cause a presentation circuitry to present the medical images according to the recognized lesion progress rate.

2. The information processing apparatus as defined in claim 1, wherein the presentation control circuitry presents a plurality of the entered medical images in the order according to the lesion progress rate.

3. The information processing apparatus as defined in claim 2, further comprising:
    lesion type recognition circuitry configured to recognize from the medical images a lesion type that represents a type of disease; and
    doctor assignment circuitry configured to assign a doctor in charge of the medical images corresponding to the lesion type recognized in the lesion progress rate recognition circuitry and information about the doctor's special field,
    wherein the presentation control circuitry cause the presentation circuitry to present the medical images for each doctor in charge based on the lesion progress rate recognized.

4. The information processing apparatus as defined in claim 1, wherein lesion progress rate recognition circuitry calculate a statistical image feature amount as a feature amount of each pixel of the medical images, thereby recognizing the lesion progress rate by using the lesion progress rate recognition circuitry which has previously completed learning based on the statistical image feature amount.

5. The information processing apparatus as defined in claim 4, in which the presentation control circuitry cause the presentation circuitry to present the medical images in a descending order of the score of the lesion progress rate recognized by the lesion progress rate recognition circuitry.

6. The information processing apparatus as defined in claim 1, wherein the presentation control circuitry cause the presentation circuitry to present the medical images based on patient information to specify a patient who is an object of the medical images.

7. The information processing apparatus as defined in claim 1, wherein the presentation control circuitry cause the presentation circuitry to present the medical images based on information about a sampled region to specify the sampled region which is an object of the medical images.

8. The information processing apparatus as defined in claim 1, wherein the presentation control circuitry cause the presentation circuitry to present a sampling region image that shows the sampling region in correspondence to the medical images.

9. The information processing apparatus as defined in claim 1, wherein the presentation control circuitry cause the presentation circuitry to present information that indicates an order of the lesion progress rate or a position of a sampling region in correspondence to the medical images.

10. The information processing apparatus as defined in claim 3, wherein the information about the doctor's special field contains information about the doctor's level of skill and the doctor assignment circuitry assign the doctor in charge according to the doctor's level of skill.

11. The information processing apparatus as defined in claim 4, wherein the presentation control circuitry cause the presentation circuitry to present a lesion progress rate recognition image corresponding to the score of the lesion progress rate which is calculated by the lesion progress rate recognition circuitry in place of the medical images.

12. An information processing method executed by the information processing apparatus having lesion progress rate recognition circuitry configured to perform prescribed image recognition processing on a plurality of entered medical images, thereby recognizing a lesion progress rate that represents a rate of progress of a disease-induced change in a living body, and a presentation control circuitry configured to cause presentation circuitry to present the medical images according to the recognized lesion progress rate, the method comprising:

performing prescribed image recognition processing on a plurality of entered medical images, thereby recognizing the lesion progress rate that represents the rate of progress of the disease-induced change in the living body;

calculating a score of the lesion progress rate as a function of (i) a number of pixels representing tissues in the medical images, (ii) a first product of a first score for normal tissues and normal confidence factors, (iii) a second product of a second score for benign tissues and benign confidence factors, and (iv) a third product of a third score for malignant tissues and malignant confidence factors; and causing the presentation circuitry to present the medical images according to the recognized lesion progress rate.

13. A non-transitory computer readable medium storing computer readable program thereon that, when executed by a computer, causes the computer to execute a process executed by information processing apparatus having lesion progress rate recognition circuitry configured to perform prescribed image recognition processing on a plurality of entered medical images, thereby recognizing a lesion progress rate that represents a rate of progress of a disease-induced change in a living body, and presentation control circuitry configured to cause presentation circuitry to present the medical images according to the lesion progress rate, the process comprising:

performing prescribed image recognition processing on a plurality of entered medical images, thereby recognizing the lesion progress rate that represents the rate of progress of the disease-induced change in the living body;

calculating a score of the lesion progress rate as a function of (i) a number of pixels representing tissues in the medical images, (ii) a first product of a first score for normal tissues and normal confidence factors, (iii) a second product of a second score for benign tissues and benign confidence factors, and (iv) a third product of a third score for malignant tissues and malignant confidence factors; and causing the presentation circuitry to present the medical images according to the recognized lesion progress rate.

* * * * *